United States Patent [19]
Kernkamp

[11] Patent Number: 5,456,199
[45] Date of Patent: Oct. 10, 1995

[54] FLUID DRAG REDUCING APPARATUS

[76] Inventor: Willem J. A. Kernkamp, 825 Tufts St., Burbank, Calif. 91504

[21] Appl. No.: 333,114

[22] Filed: Nov. 1, 1994

Related U.S. Application Data

[63] Continuation of Ser. No. 859,997, Mar. 30, 1992, abandoned.

[51] Int. Cl.6 .................................................. B63H 9/04
[52] U.S. Cl. ....................................... 114/111; 114/243
[58] Field of Search .......................... 114/243–245, 253, 114/89, 90, 97, 102, 103, 111; 244/130

[56] References Cited

U.S. PATENT DOCUMENTS

| | | | |
|---|---|---|---|
| 2,397,957 | 4/1946 | Freeman | 114/243 |
| 2,435,956 | 2/1948 | Craig | 114/243 |
| 2,899,150 | 8/1959 | Ellis, Jr. | 244/130 |
| 3,443,020 | 5/1969 | Loshigian | 114/243 |
| 3,461,830 | 8/1969 | Pearce et al. | 114/243 |
| 3,611,976 | 10/1971 | Hale | 114/235 F |
| 3,613,627 | 10/1971 | Kennedy | 114/243 |
| 3,712,261 | 1/1973 | McLelland et al. | 114/235 |
| 3,859,949 | 1/1975 | Toussaint et al. | 114/235 |
| 4,033,279 | 7/1977 | Stiles | 114/243 |
| 4,075,967 | 2/1978 | Silvey | 114/243 |
| 4,542,708 | 9/1985 | Holcombe et al. | 114/243 |
| 4,567,841 | 2/1986 | Hale | 114/221 R |
| 4,593,638 | 6/1986 | Cochran et al. | 114/39 |
| 4,690,088 | 9/1987 | Perini | 114/102 |
| 4,700,651 | 10/1987 | Hale | 114/243 |
| 4,708,075 | 11/1987 | des Snead | 114/39.1 |
| 4,781,137 | 11/1988 | Clauser | 114/102 |

*Primary Examiner*—Edwin L. Swinehart
*Attorney, Agent, or Firm*—Lyon & Lyon

[57] ABSTRACT

A unique fluid drag reducing structure arranged such that the center of mass of the apparatus, when assembled, is positioned forward of the center of rotation of the apparatus when installed. Such an arrangement assures that the apparatus will be flutter free, while still allowing the apparatus to feather into the wind. The structure of and method for assembly provides for easy installation and removal of the apparatus on existing cylindrical structures without the need to disassemble the existing structure.

14 Claims, 5 Drawing Sheets 5,456,199

FLUID DRAG REDUCING APPARATUS

This is a continuation of application Ser. No. 07/859,997 filed on Mar. 30, 1992, now abandoned.

BACKGROUND

1. Field of the Invention

The field of the present invention is drag reducing apparatus; more specifically, apparatus for reducing aero/hydrodynamic drag on cylindrical objects.

2. Prior Art

While apparatus and devices for reducing either aerodynamic or hydrodynamic drag on ropes and wires are not new they suffer from several disadvantages. First they are usually fixed and are not capable of feathering in the wind. The devices capable of feathering usually have a problem with flutter and reduced efficiency. Furthermore, the known devices are usually heavy making them difficult to install and limiting their uses. Finally, the known devices are generally permanent, in that once they are installed, it is difficult, or impossible, without disassembly of the main cylindrical structure to remove.

SUMMARY OF THE INVENTION

The present invention employs a unique structure arranged such that the center of mass of the apparatus, when assembled, is positioned forward of the center of rotation of the apparatus when installed. Such an arrangement assures that the device will be flutter free, while still allowing the apparatus to feather into the wind. The structure of and method for assembly provides for easy installation and removal of the apparatus on existing cylindrical structures without the need to disassemble the existing structure.

In its presently preferred embodiment the invention comprises an outer skin, a restraining bearing, a longitudinal stiffening means and a closure means. In certain applications when it is desirable to have multiple segments of the apparatus low friction bearing means may be employed between the segments.

Accordingly, it is an object of the present invention to provide for a lightweight, easily installed and easily removable fluid drag reducing apparatus and system. It is a further object of the present invention to provide a method for replaceably installing fluid drag reducing apparatus and systems. BRIEF DESCRIPTION OF THE DRAWINGS FIG. 1 is a cross-sectional view of a presently preferred embodiment of a fluid drag reducing system incorporating the invention.

DETAILED DESCRIPTION OF THE PREFERRED EMBODIMENT

Figure 1:
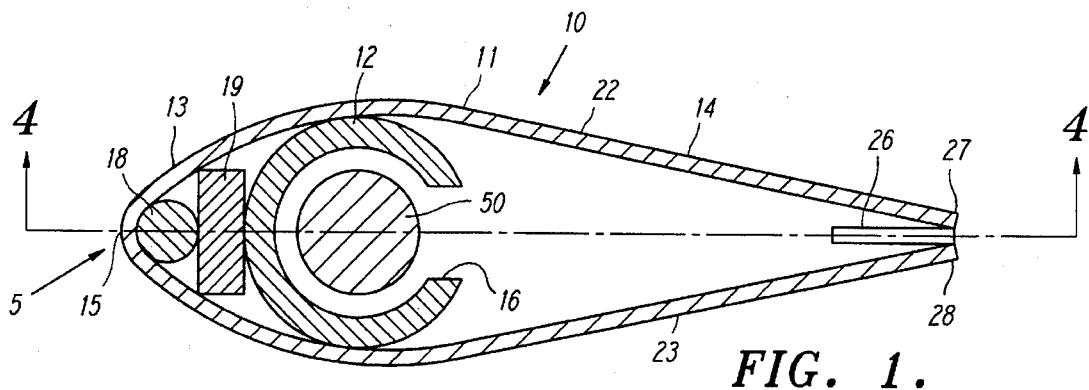

As best shown in FIG. 1, the presently preferred embodiment of the fluid drag reducing apparatus 10 incorporating the invention for use on the mast stays on a sailboat is comprised of an outer skin 11, and a restraining bearing 12. The outer skin 11 comprises a nose portion 13 and a tail portion 14. The nose portion 13 is formed so that it has a nose tip 15. Because of the unique construction of the fluid drag reducing apparatus 10 the nose tip 15 is always facing directly into the wind depicted by arrow 5. The outer skin 13 may be constructed from any material that is flexible to allow its formation into a fluid dynamic contour, yet has sufficient rigidity to maintain its fluid dynamic contour to a sufficient degree so as not to defeat its drag reducing effect. In the case of yacht racing, in addition to these properties the material must also be very light in weight. A suitable material for the yacht racing application, such as the America's Cup races, it has been found advantageous to use state of the art sail cloth having a thickness of approximately 3 mils. In certain circumstances high grade construction board has proven satisfactory. Naturally, where weight is not a consideration, sturdier and heavier materials may be employed.

The restraining bearing 12 is formed to allow removable attachment to the cylindrical structure on which the drag reducing apparatus is installed, which in the case of a sail boat is preferably the mast stays depicted in the Figures by the wire 50. The restraining bearing in the presently preferred application for use in yacht races is constructed of a PVC material that is cylindrical with a longitudinal slot 16 along the entire length of the restraining bearing 12. The inner diameter of the restraining bearing 12 is slightly larger than the wire 50. The longitudinal slot 16 is slightly smaller in width than the diameter of the wire 50 such that the wire 50, due to the flexibility of the walls of the restraining bearing 12, can be pressed into the restraining bearing 12. The longitudinal slot 16, however is sufficiently narrow in width that natural forces, such as the wind, cannot result in the detachment of the restraining bearing 12 from the wire 50. It will also be appreciated that other attachment arrangement can be employed depending on the application.

Figure 4:
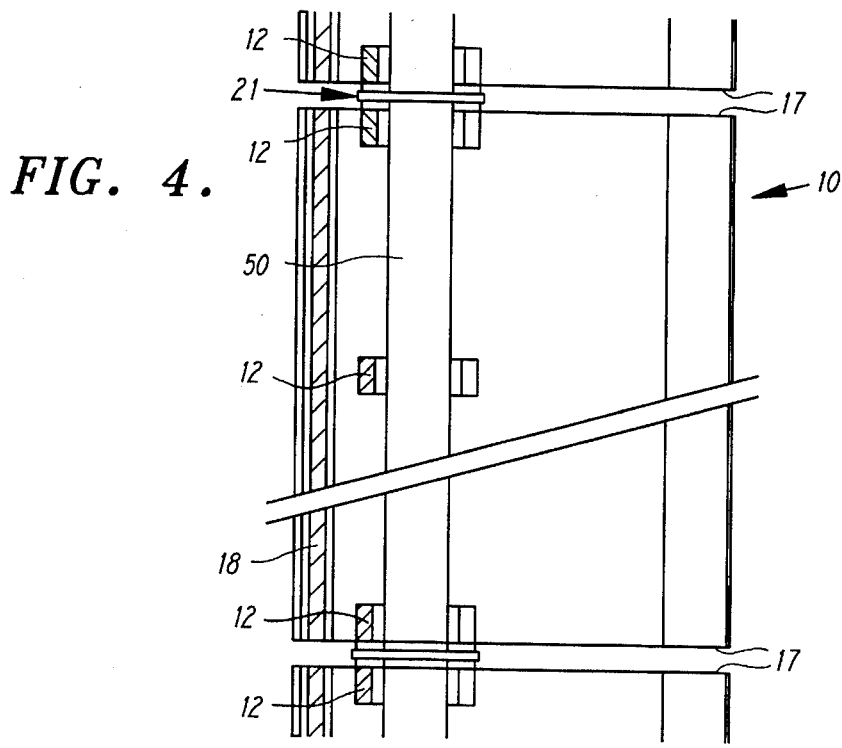
FIG. 4 is a view of a fluid drag reducing system taken along plane 4—4 of FIG. 1.

The restraining bearing 12 can extend the length of the fluid drag reducing apparatus. It has been found that weight savings can be realized by utilizing two restraining bearings 12, one at each end 17 of the drag reducing apparatus as best shown in FIG. 4. In the present application of Yacht racing, it has been found advantageous to use a length of approximately three feet for the apparatus. If a longer length is used, or additional support is desired, another restraining bearing 12 can be used between the ends 17.

The outer skin 11 in the preferred embodiment permanently attached to the restraining bearing 12 at two locations. The attachment of the outer skin 11 to the restraining bearing forms the nose 13. The nose 13 should preferably have a blunt rounded contour. To add stiffness to the drag reducing apparatus 10, a stiffening means may be employed in the nose 13. The stiffening means may be a long lightweight rod 18 having a diameter approximating the desired curvature for the nose tip 15. Alternatively, a single restraining bearing 12, extending the length of the apparatus may be used. The stiffening means helps maintain the desired fluid dynamic contour of the nose 13. A spacer 19, located between the restraining bearing 12 and the rod 18 may be employed to help achieve the desired nose contour while keeping weight at a minimum. The rod 18 is attached along its length to the outer skin 11. If the wind conditions are known and relatively constant, or if a fixed nose contour is adequate for the application, the rod 18 may also be permanently attached to the restraining bearing 12. If it is desirable to be able to change the shape of the apparatus, the rod 18 need not be attached to the restraining bearing 12, allowing the appropriate size spacer 19 to be inserted. To assist in keeping the apparatus in the desired shape, a filler 20, preferably made of foam, may be used in the interior of the tail portion 14 as shown in FIG. 2.

As shown in FIG. 4 more than one fluid drag reducing apparatus 10 may be employed on a single cylindrical structure such as mast stay. In this type of application, one in which the drag reducing apparatus will bear upon each other at their ends, it has been found particularly advantageous to employ flat bearings 21 between the apparatus. This allows the apparatus to feather independently. An advantageous and removable bearing 21 has been found to be made of a low friction plastic or other material and shaped in a ring with a small slot. To attach the flat bearing 21 the bearing 21 is placed at an angle to the wire 50 with the slot against the wire 50. The ends of the flat bearing 21 are pulled in opposite directions perpendicular to the flat surface of the bearing 21 to allow the flat bearing to be installed on the wire 50.

Figure 3:
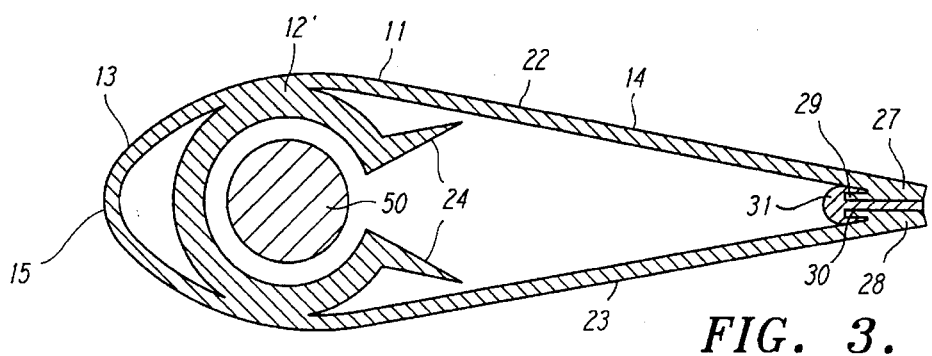
FIG. 3 is a cross-sectional view of another alternative embodiment of a fluid drag reducing apparatus incorporating the invention.

FIG. 3 depicts another embodiment of the drag reducing apparatus. In this embodiment the outer skin 11 and the restraining bearing 12 are integrally formed in an extrusion process. The outer skin 11 and the restraining bearing 12 in this application are made from a plastic resin. The restraining in this embodiment may include flared lips 24 to assist in the installation and removal process. The nose 13 can be stiffened by making the walls of the nose 13 thicker if desired.

Figure 2:
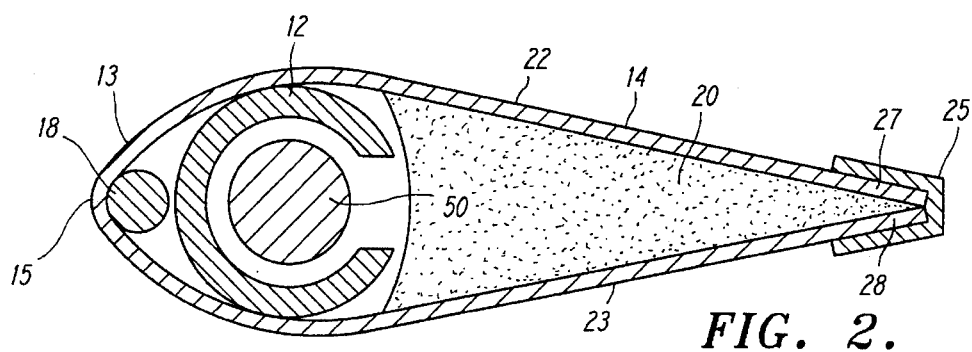
FIG. 2 is a cross-sectional view of an alternative embodiment of a fluid drag reducing apparatus incorporating the invention.
Figure 5:
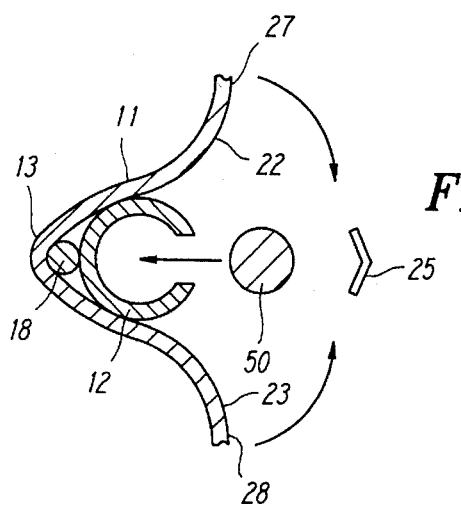
FIG. 5 is a cross-sectional view of various components of a fluid drag reducing apparatus and illustrating a method of installation of the apparatus on a cylindrical structure.

In the embodiments shown in FIGS. 1–3, when the outer skin 11 is attached to the restraining bearing 12 and before installation on the cylindrical structure, tail flaps 22 and 23, as best shown in FIG. 5, are created. The preferred method of installing the fluid drag reducing apparatus on a cylindrical structure as shown in FIG. 5 is by positioning the tail flaps 22 and 23 of the fluid drag reducing apparatus on either side of the cylindrical structure 50 on which the fluid drag reducing apparatus is to be installed; capturing the cylindrical structure 50 with the restraining bearing 12 ensuring that the center of mass of the apparatus is located in the nose of the apparatus; forming the tail flaps 22 and 23 to the desired shape; and attaching the tail flaps 22 and 23 together to maintain the desired shape. The securing of the two tail flaps 22 and 23 along their edges 27 and 28 may be accomplished by using adhesive tape 25, or preferably a double-sided adhesive tape 26 which does not create any ridges on the outer skin. It should also be understood that a hook and loop fastener, such as the product sold under the mark VEL-CRO™ or other type of removable fastener may be employed. When double-sided tape is employed the tape 26 is preferably attached to one of the edges 27 leaving the backing on the other side of the tape 26 prior to capturing the wire 50. When the tail contour is formed the backing on the other side of the tape 26 is peeled off and attached to the other edge 28. In the extruded embodiment FIG. 3 the edges 27 and 28 can be formed with flanges 29 and 30 that are formed to be interlocking with an elongated clip 31 with a longitudinal slot that interlocks with the flanges 29 and 30. In this application when the flaps are formed into the desired contour the clip 31 is slid over the two flanges 29 and 30.

When multiple apparatus are used in a system these steps are merely repeated. When multiple apparatus are employed for example on the stays of a racing yacht the drag reducing apparatus or fairing is slid along the stay in the direction of the top of the mast and another fairing is installed by repeating these steps until the desired length of the stay is enshrouded by the fairings. The flat bearing is installed after the fairing is installed in the manner previously described.

Figure 11:
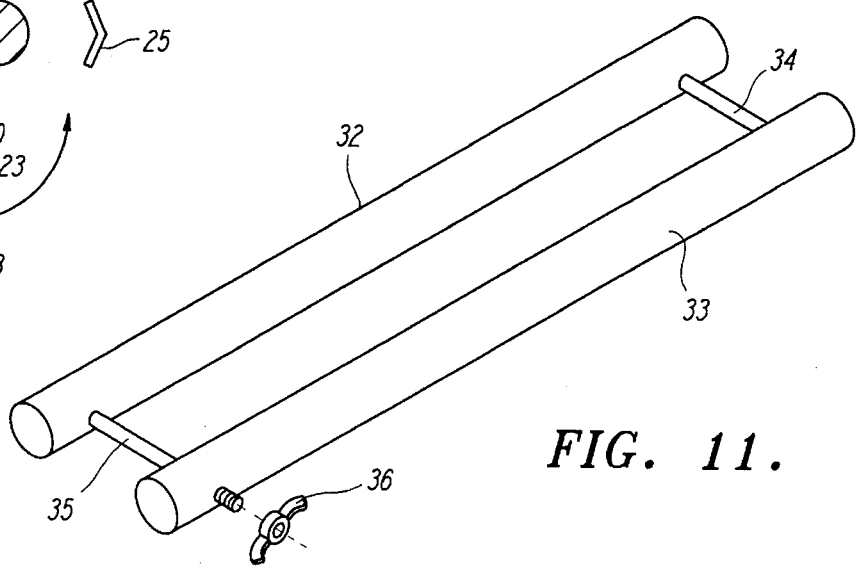
FIG. 11 is a view of the clamp bars used in installing the fluid drag reducing apparatus incorporating the present invention.

In certain circumstances it has proven useful to employ a set of clamp bars 32 and 33 as shown in FIG. 11. When the fairing or drag reducing apparatus is being installed in this manner the tail flaps are clamped between a set of clamp bars 32 and 33 just before forming the flaps to the desired tail contour. The clamp bars are attached at one end by a pin 34 and a threaded stud 35 and wing nut 36 at the other end.

Figure 9:
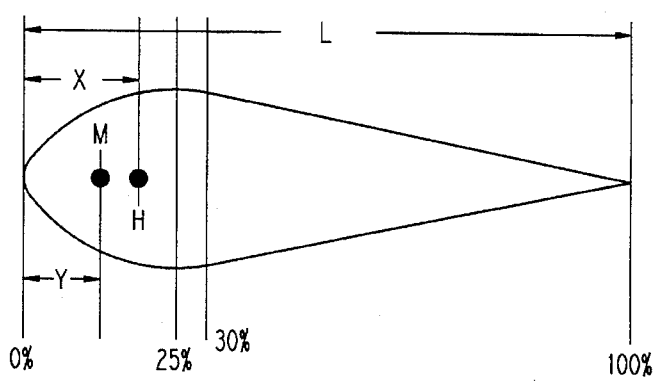
FIG. 9 is a diagrammatic representation of the preferred locations of the center of rotation and the center of mass of a drag reducing apparatus incorporating the present invention.

As shown diagrammatically in FIG. 9. the drag reducing apparatus has an overall length L. To ensure that the device feathers, the center of rotation H should be at a point less than 0.3 L and preferably 0.25 L from the nose tip 15. The center of rotation preferably being less than 25% of the axial length from the tip. To avoid fluttering the apparatus, the center of mass M should be located between the center of rotation and the nose tip and may even be located at a point ahead of the nose tip. In applications where weight is major concern, such as yacht racing, the center of mass M will approach the center of rotation. Also, depending on the application, the center of mass M and the center of rotation H should be preferably substantially aligned along the longitudinal axis of the apparatus. When a bias is desired or the apparatus is not symmetrical, the center of mass M may be positioned in other locations.

Figure 12:
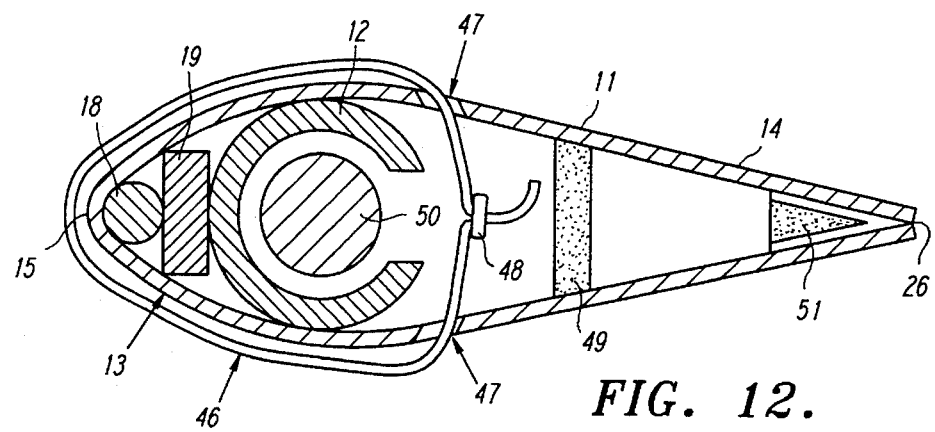
FIG. 12 is a cross sectional view of another embodiment of a drag reducing apparatus incorporating the present invention.

FIG. 12 depicts a further embodiment employing a retaining strap 46 to ensure that the apparatus remains attached to the cylindrical structure during rough conditions. This is accomplished by forming holes 47 in the outer skin and threading the retaining strap 46 through these holes. Prior to attachment of the tail flaps the retaining strap is tightened and secured by a clip 48. An optional rib 49 preferably made of foam, as well as a tip 51 may be utilized to help maintain the fluid dynamic shape. When employing the optional tip 51 or filler 20, the adhesive may be applied to one of the sides of these pieces to accomplish the attachment of the flaps.

Figure 10:
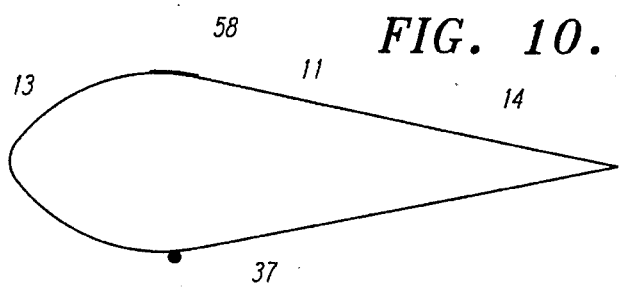
FIG. 10 is an end view of just the outer skin of a drag reducing apparatus incorporating the present invention for use in laminar flow conditions.

In laminar flow conditions it has proven advantageous to employ a trip wire 37 or a rough surface 38 at or near the area of maximum thickness of the apparatus to prevent or minimize flow separation as shown in FIG. 10. This will create turbulence in the boundary layer and avoid stagnant air along the tail 14.

Figure 6:
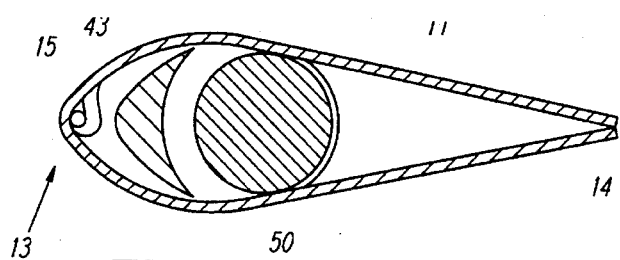
FIG. 6 is a cross-sectional view of yet another embodiment of a fluid drag reducing apparatus incorporating the present invention.
Figure 7:
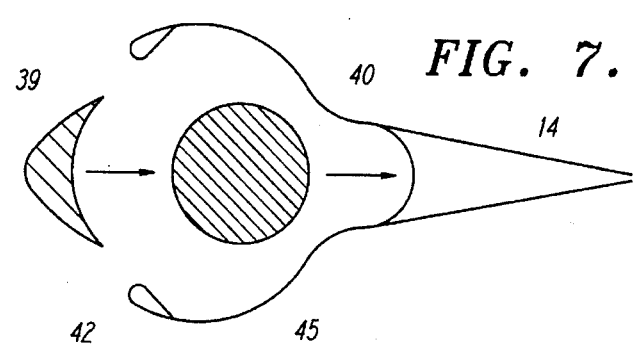
FIG. 7 is a cross-sectional view of various components of the fluid drag reducing apparatus depicted in FIG. 6 illustrating a method of installation of the apparatus on a cylindrical structure.
Figure 8:
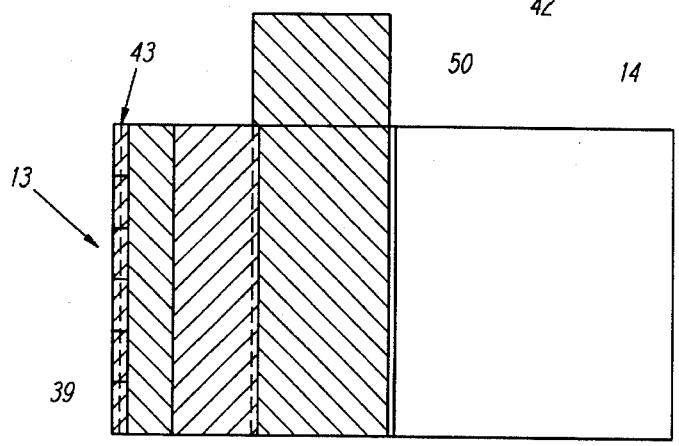
FIG. 8 is a plan view of the fluid drag reducing apparatus of FIG. 6.

The apparatus may be constructed to provide for installation from the nose 13. As shown in FIGS. 6–8 the outer skin 11 can be formed of one piece with the opening at the nose 13 rather than the tail 14. In this application construction paper was used. A restraining bearing 12 was omitted and a contoured spacer 39 was used to provide stiffness and a bearing surface. A membrane 40 is included to cradle the wire 50 and help maintain the desired shape. alternating Loops 41 and 42 are formed in the edges of the nose flaps 44 and 45. A round slat 43 such as piano wire is interwoven through the loops 44 and 45 to obtain closure.

Figure 13A:
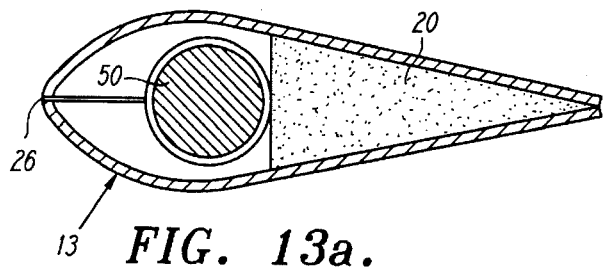
FIGS. 13a and 13b are cross sectional views of another embodiment of a drag reducing apparatus incorporating the present invention in the installed position and the uninstalled position.
Figure 13B:
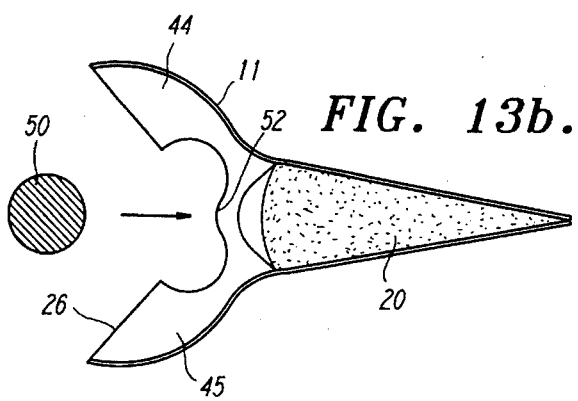

Additionally, as shown in FIG. 13a and 13b the nose 13 can be formed from an extruded resinous material with the nose flaps 44 and 45 connected by an automatic hinge 52. As the wire 50 is pressed against the automatic hinge 52 the hinge snaps from the open position to the closed position. Double-sided adhesive tape 26 is employed to help keep the nose flaps together during use. the outer skin 11 is used to attach, through bonding or glueing, the extruded nose 13 to the filler 20, providing a hinging action during installation and removal of the apparatus.

Figure 14A:
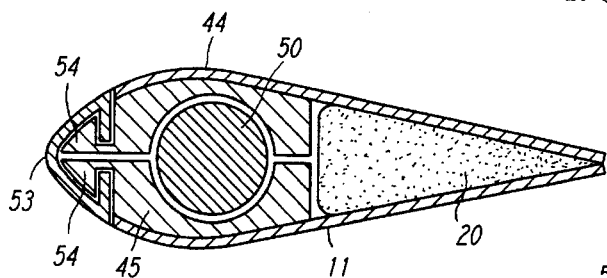
FIGS. 14a and 14b are cross sectional views of another embodiment of a drag reducing apparatus incorporating the present invention in the installed position and the uninstalled position.
Figure 14B:
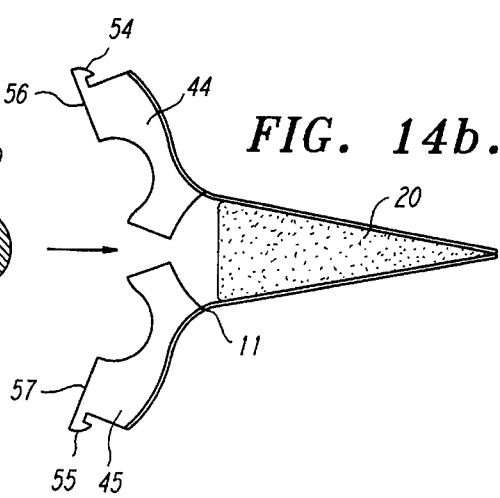

FIGS. 14a and 14b depict yet another embodiment of the nose 13. In this embodiment, a nose clip 53 is formed to secure the nose flaps 44 and 45. The nose flaps are formed with extensions 56 and 57, having raised beads 54 and 55. This approach has an advantage over the embodiment of FIG. 13 in that it provides a smooth nose tip 15. However, it does add another component to the apparatus. Closure of the nose 13 in this application is obtained in a similar fashion as are the tail flaps in the embodiment shown in FIG. 3.

Figure 15A:
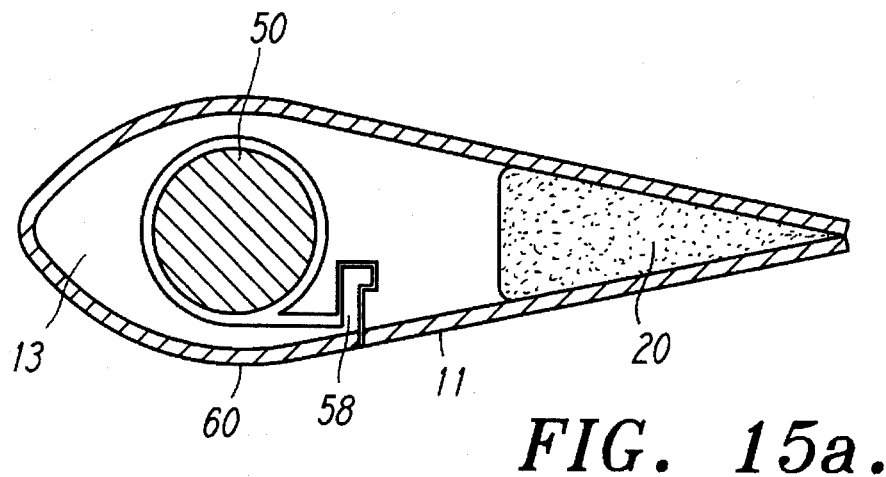
FIGS. 15a and 15b are cross sectional views of another embodiment of a drag reducing apparatus incorporating the present invention in the installed position and the uninstalled position.
Figure 15B:
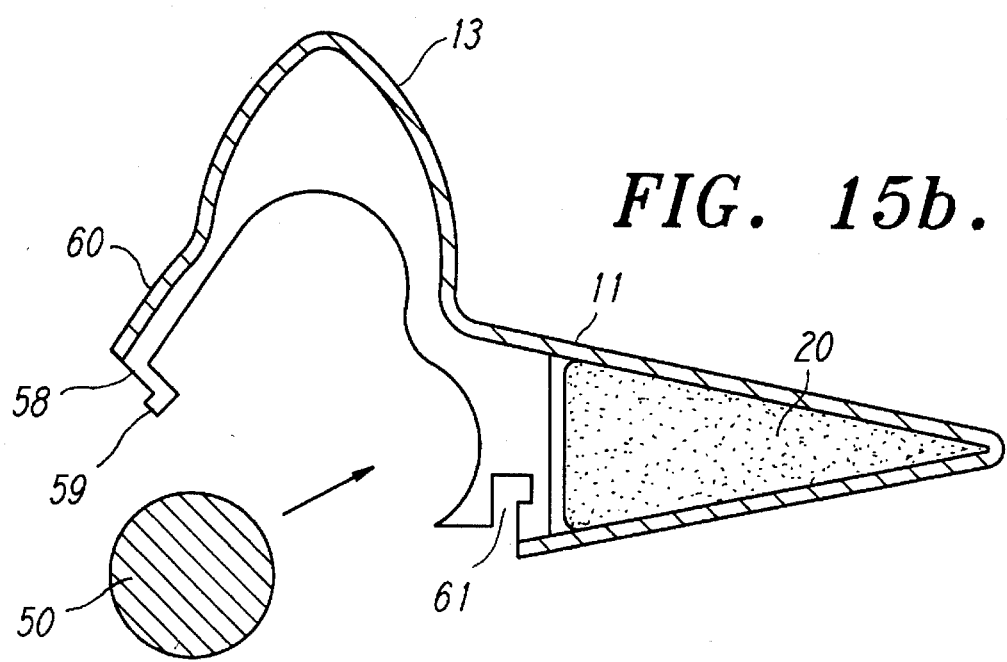

The fluid drag reducing apparatus may also be formed to allow side installation as shown best in FIGS. 15a and 15b. Once again the nose 13 is preferably formed from an extruded resin. The outer skin 11, which may be a low friction material with adhesive backing, is used to connect the filler 20 and the nose 13. The nose 13 is formed with a side flap 60 having a latch 58 with a raised bead 59. A mating channel 61 is formed in the side of the nose 13 which removably locks the latch 58 in place capturing the wire 50.

The weight and other properties of the extruded resin can be used to provide the necessary stiffness and mass to the nose 13 to ensure proper operation of the apparatus in the appropriate conditions.

While embodiments and applications of this invention have been shown and described, it will be apparent to those skilled in the art that many more modifications are possible without departing from the inventive concepts described herein. The invention therefore is not to be restricted except in the spirit of the appended claims.

I claim as follows:

1. An aerodynamic rigging system comprising:
   a mast stay;
   an anti-feathering apparatus, said apparatus having an axial length less than the length of said mast stay, comprising
   an outer skin;
   a restraining bearing, said restraining bearing rotatably capturing said mast stay; said outer skin permanently affixed to said restraining bearing;
   a nose, said nose comprising an aerodynamic cross-sectional shape and located between said outer skin and said restraining bearing forward of the center of rotation of said apparatus, said nose being stiffened along the entire axial length of said apparatus;
   a first flap and a second flap, said first flap and said second flap attached to said nose;
   a closure attaching said first flap to said second flap to form a tail; and
   a center of mass, said center of mass located in said nose forward of said center of rotation of said apparatus around said mast stay.

2. The apparatus of claim 1 further comprising two restraining bearings, each of said restraining bearings capturing said mast stay said restraining bearings having a length substantially less than the axial length of said apparatus; one of said two bearings is attached at first axial end of said apparatus and said other of said two bearings is attached at a second axial end of said apparatus; said two restraining bearings being substantially longitudinally aligned.

3. The apparatus of claim 2 further comprising at least one restraining bearing attached to said outer skin intermediate said first and second ends, wherein said at least one restraining bearing is substantially longitudinally aligned with said two restraining bearings attached at said ends of said outer skin.

4. The apparatus of claim 1 further comprising a shape holding means for maintaining the desired shape of said nose.

5. The apparatus of claim 1 further comprising a shape holding means for maintaining the desired shape of said tail.

6. The apparatus of claim 1 wherein said closure means includes a strip having adhesive on at least one side.

7. The apparatus of claim 1 wherein said restraining bearing is formed to have a c-shape in cross section.

8. The apparatus of claim 1 wherein said restraining bearing material is a low weight plastic.

9. The apparatus of claim 1 wherein said outer skin is comprised of sail cloth.

10. The apparatus of claim 1 wherein the cross sectional shape of said apparatus is that of a fluid dynamic foil and the center of rotation of said apparatus about said mast stay is a distance "x" from the tip of said nose wherein "x" is less than 30% of said axial length.

11. The apparatus of claim 1 wherein the cross sectional shape of said apparatus is that of a fluid dynamic foil and the center of rotation of said apparatus about said mast stay is a distance "x" from the tip of said nose wherein "x" is less than 25% of said axial length.

12. The apparatus of claim 1 wherein the cross sectional shape of said apparatus is that of a fluid dynamic foil and the center of rotation of said apparatus about said mast stay is a distance "x" from the tip of said nose wherein "x" is less than 30% of said axial length and said center of mass is located a distance "y" from the tip of said nose wherein "y" is smaller than "x".

13. The apparatus of claim 1 wherein said outer skin further comprises a rough texture in the area of the cross sectional maximum thickness between said nose and said tail.

14. A fluid drag reducing system comprising a plurality of fluid drag reducing apparatus for rotational attachment on cylindrical structures comprising:

an outer skin;

a C-shaped restraining bearing; the axis of rotation of said apparatus about said cylindrical structures coincident with said longitudinal axis of said restraining bearing; said outer skin permanently affixed to said restraining bearing to form a nose, a first flap and a second flap, said nose comprising a tip;

a stiffener, said stiffener integral with said nose;

a tail comprising a closure attaching said first flap to said second flap;

a center of mass in said nose between said axis of rotation of said apparatus about said cylindrical structure and said tip of said nose;

wherein when said apparatus are installed on a cylindrical body, said apparatus are separated by low friction bearings.

* * * * *